Patented Jan. 3, 1939

2,142,292

UNITED STATES PATENT OFFICE 2,142,292

PROCESS FOR MANUFACTURING ARTIFICIAL LEATHER

Steven Jan Blaupot ten Cate, Kootwijk, Netherlands

No Drawing. Application July 28, 1936, Serial No. 93,119. In the Netherlands September 25, 1935

4 Claims. (Cl. 91—68)

Patent application Serial No. 726,001 describes a process for manufacturing artificial leather with 38–60% of rubber by impregnating a coherent loose body of fibres with a rubber dispersion or solution, the said process being characterized by the feature that the surface of the body of fibres prior to impregnation is provided with a small amount of an adhesive in such a way that the fibres of the surface stick together, the surface itself however remains permeable for the impregnating agent. According to an embodiment of this process impregnation is effected by passing the body of fibres two or more times at a low pressure between cylinders, simultaneously supplying the rubber dispersion or solution between the cylinders, and drying and calendering the impregnated body of fibres between the successive impregnation. The first impregnation is effected with a non-viscous binding agent, e. g., latex, with a low proportion of fillers; the second impregnating is preferably carried out with rubber dispersions containing a large amount of fillers.

The material manufactured in this way has very good properties. It has appeared, however, that from the nonlacquered surface when exposed to friction, fibres are loosened so that this surface obtains a more or less woolly character, which is harmful for the leatherlike appearance of the material.

According to the invention this difficulty can be avoided and the manufacturing process can be simplified at the same time by effecting the further impregnation of the material which has been subjected to a first impregnation step by means of cylinders in the above mentioned way and subsequently dried by spreading a rubber dispersion or solution containing a large amount of fillers on the front face and/or back face of the body of fibres so as to cause a thorough penetration of the said dispersion or solution into the material. This treatment is preferably effected on the product which after the first impregnation has been dried and calendered.

After spreading the rubber dispersion on the surface of the material this can be treated in the usual way, e. g., dried, calendered and finished.

I have found that it is possible in this way to obtain a very satisfactory penetration of the rubber dispersion or solution into the body of fibres, especially when the rubber dispersion is spread on the surface by means of a knife with a blunt edge so that if desired an equally large amount of rubber can be incorporated in the material as in the second impregnating step according to the application Serial No. 726,001. Moreover the process according to the invention has the advantage that the fibres of the surface are better fixed and that the appearance of the material is more leatherlike. Dependent from the proportion of rubber to be incorporated in the material the strongly filled rubber dispersion or solution can be spread in one or more strokes.

The proportion of fillers can be very considerable, e. g., 300–400%, calculated on the weight of the rubber in the dispersion or solution. Apart from the said fillers vulcanizing agents, accelerators, coloring materials, etc., can be added. If desired a self-vulcanizing rubber mixture can be used.

I have also found that in a product obtained in this way the cellulose lacquer coating can be better consolidated with the material than in a product which has been obtained by impregnating two or more times by means of cylinders. In connection therewith it is advantageous to replace the first coating with cellulose lacquer in the manufacture of lacquered artificial leather by the above mentioned treatment with a concentrated rubber dispersion containing a large amount of fillers, by a spreading process in one or more strokes. If desired the rubber-dispersion can be colored in the shade of the lacquer coating to be provided later on by adding coloring materials.

The rubber dispersion provided on the once impregnated material by the spreading process indicated above penetrates into the material to a considerable extent. By this treatment the cavities between the fibres are better filled up than in the second impregnation by means of cylinders described in Patent No. 726,001. Moreover the manufacturing process is considerably simplified by omitting the second impregnation.

According to the invention products containing 38–60% of rubber can be easily produced. However, in some cases very satisfactory results are obtained with a lower percentage of rubber, e. g., 20–39%. The use of a relatively low percentage of rubber is especially suitable for manufacturing thin materials, because when impregnating a layer of fibres having a considerable thickness, the rubber is sieved out from the dispersion to a certain, although very small extent, so that in manufacturing thicker materials more rubber must be incorporated in the body of fibres for obtaining an absolutely uniform penetration.

I claim:
1. A process for manufacturing artificial leather by impregnating a cohering loose body of fibres with a rubber dispersion or solution comprising providing the surface of the body of fibres, prior to impregnation, with a small amount of an adhesive so as to cement the fibres of the surface together without seriously impeding the permeability of the surface for the impregnating agent, impregnating the body of fibres by passing the same between cylinders and simultaneously supplying a rubber dispersion or solution between the same, drying and calendering the material, applying a rubber dispersion or solution containing a large amount of fillers to at least one of the faces of the calendered material, spreading said dispersion or solution to cause it to penetrate into the material, and subsequently finishing the material according to methods known per se.

2. A process for manufacturing artificial leather by impregnating a cohering loose body of fibres with a rubber dispersion or solution comprising providing the surface of the body of fibres, prior to impregnation, with a small amount of an adhesive so as to cement the fibres of the surface together without seriously impeding the permeability of the surface for the impregnating agent, impregnating the body of fibres by passing the same between cylinders and simultaneously supplying a rubber dispersion or solution between the same, drying and calendering the material, applying a rubber dispersion or solution containing a large amount of fillers to at least one of the faces of the calendered material, spreading said dispersion or solution by means of a knife with a blunt edge, so as to cause it to penetrate into the material and subsequently finishing the material according to methods known per se.

3. A process for manufacturing artificial leather by impregnating a cohering loose body of fibres with a rubber dispersion or solution comprising providing the surface of the body of fibres, prior to impregnation with a small amount of an adhesive so as to cement the fibres of the surface together without seriously impeding the permeability of the surface for the impregnating agent, impregnating the body of fibres by passing the same between cylinders and simultaneously suplying a rubber disperson or solution between the same, drying and calendering the material, applying a rubber disperson or solution containing a large amount of fillers to the front face of the calendered material, spreading said dispersion or solution by means of a knife with a blunt edge, so as to cause it to penetrate into the material, applying a cellulose lacquer coating and subsequently finishing the material according to methods known per se.

4. A process for manufacturing artificial leather by impregnating a cohering loose body of fibres with a rubber dispersion or solution comprising providing the surface of the body of fibres, prior to impregnation with a small amount of an adhesive so as to cement the fibres of the surface together without seriously impeding the permeability of the surface for the impregnating agent, impregnating the body of fibres by passing the same between cylinders and simultaneously supplying a rubber dispersion or solution between the same, drying and calendering the material, applying a rubber dispersion or solution containing a large amount of fillers and also containing coloring materials to the front face of the calendered material, spreading said dispersion or solution by means of a knife with a blunt edge, so as to cause it to penetrate into the material, applying a cellulose lacquer coating of the same color as the coloring materials and subsequently finishing the material according to methods known per se.

STEVEN JAN BLAUPOT TEN CATE.